United States Patent
Huldén

(10) Patent No.: US 7,206,677 B2
(45) Date of Patent: Apr. 17, 2007

(54) EFFICIENT NAVIGATION OF AUTONOMOUS CARRIERS

(75) Inventor: Jarl Huldén, Solna (SE)

(73) Assignee: Aktiebolaget Electrolux, Stockholm (SE)

( * ) Notice: Subject to any disclaimer, the term of this patent is extended or adjusted under 35 U.S.C. 154(b) by 518 days.

(21) Appl. No.: 10/471,480

(22) PCT Filed: Mar. 13, 2002

(86) PCT No.: PCT/SE02/00471

§ 371 (c)(1),
(2), (4) Date: Jan. 2, 2004

(87) PCT Pub. No.: WO02/075470

PCT Pub. Date: Sep. 26, 2002

(65) Prior Publication Data

US 2004/0117079 A1    Jun. 17, 2004

(30) Foreign Application Priority Data

Mar. 15, 2001    (SE) .................................. 0100924

(51) Int. Cl.
*G06F 19/00* (2006.01)
(52) U.S. Cl. ............................. 701/23; 701/25; 701/26
(58) Field of Classification Search .................. 701/23, 701/25, 26
See application file for complete search history.

(56) References Cited

U.S. PATENT DOCUMENTS

| | | | |
|---|---|---|---|
| 4,852,677 A | 8/1989 | Okazaki | |
| 5,156,038 A | 10/1992 | Kozikaro | |
| 5,214,822 A | 6/1993 | Sakurai et al. | |
| 5,325,468 A * | 6/1994 | Terasaki et al. | 700/262 |
| 5,353,224 A * | 10/1994 | Lee et al. | 701/25 |
| 5,402,365 A | 3/1995 | Kozikaro et al. | |
| 5,440,216 A | 8/1995 | Kim | |
| 5,677,836 A * | 10/1997 | Bauer | 701/23 |
| 5,684,695 A * | 11/1997 | Bauer | 701/23 |
| 5,720,077 A | 2/1998 | Nakamura et al. | |
| 5,794,166 A | 8/1998 | Bauer et al. | |
| 5,815,880 A | 10/1998 | Nakanishi | |
| 5,935,179 A | 8/1999 | Kleiner et al. | |

FOREIGN PATENT DOCUMENTS

EP    0 803 224 A2    10/1997

(Continued)

*Primary Examiner*—Thomas Black
*Assistant Examiner*—Marie A Weiskopf
(74) *Attorney, Agent, or Firm*—Pearne & Gordon LLP

(57) ABSTRACT

According to the invention, autonomous carriers or vehicles are efficiently navigated over a field of operation. The carriers are equipped to execute a selected procedure at more than one desired location on the field, and the navigation system of the invention directs the carrier to the location that is preferentially accessible to it, based on a defined criterion. After the carrier has executed the selected procedure at the location which is preferentially accessible to it, the navigation system directs the carrier to the location which is preferentially accessible to the carrier from the carrier's new position. This procedure is repeated until all the locations at which the procedure is to be executed have been reached. The task of determining a navigation route to a location that can be preferentially accessed is based on an efficient, structured search procedure of low computational complexity.

25 Claims, 13 Drawing Sheets

| | FOREIGN PATENT DOCUMENTS | |
|---|---|---|
| JP | 9-319435 | 12/1997 |
| WO | WO 95/26512 | 5/1995 |
| WO | WO 97/40734 | 11/1997 |
| WO | WO 97/41451 | 11/1997 |
| WO | WO 99/40496 | 8/1999 |
| WO | WO 99/59402 | 11/1999 |
| WO | WO/00/10062 | 2/2000 |
| WO | WO 00/38025 | 6/2000 |
| WO | WO 00/38028 | 6/2000 |
| WO | WO 00/38029 | 6/2000 |

\* cited by examiner

EFFICIENT NAVIGATION OF AUTONOMOUS CARRIERS

TECHNICAL FIELD OF THE INVENTION

The present invention relates, generally, to an autonomous carrier or vehicle having a navigation system for efficiently guiding the carrier or vehicle to selected locations on a surface or field of operation where desired procedures may be performed.

BACKGROUND OF THE INVENTION

It is well known in the prior art to provide autonomous carriers or vehicles with a systems for guidance and navigation, together with a sensing system for obstacle detection. The sensing system generally sweeps around the horizon in a manner similar, for example, to a ship's radar. Systems of these types are often used with surface treatment apparatuses such as autonomous or robotic vacuum cleaners as, for example, are disclosed in International Patent Applications WO 97/41451 (U.S. Pat. No. 5,935,179) and WO 00/38028. The autonomous surface treatment apparatuses generally have a main body supported on or by a number of motor-driven wheels or rollers and include means for surface treatment, such as a rotating brush in combination with a vacuum cleaning device.

The foregoing devices normally employ a microprocessor, together with appropriate software, for controlling the operation of the devices. Typically, the microprocessor receives input data from the wheels and sensing system for the purpose of enabling the position of the device to be fixed, as well as the locations of any walls and obstacles to be determined. This input data is then used as the basis for navigating the autonomous apparatus so that, for instance, it will be able to perform a cleaning function or other surface-treatment function according to a predetermined strategy while at the same time avoiding collisions with any obstacles and barriers such as walls, tables, bookcases or the like.

Many robotic vacuum cleaners in use today initiate their cleaning task by tracking the walls of the room to be vacuumed. Thereafter, they continue their function by moving in a random pattern over the room until the control systems for the cleaners estimate that the entire room, apart from where obstacles are located, has been cleaned. Although this strategy can work quite well, more often than not it results in the vacuum cleaner going over the same area several times, while other areas remain uncleaned even after an extended period of operation.

The issue of providing a more efficient strategy for navigating an autonomous surface treatment apparatus over a given area has been addressed in the prior art. For example, U.S. Pat. No. 4,674,048 relates to a guidance system for a mobile robot, which system is based on the creation of a grid-like map for the surface to be treated. Columns and rows are defined on the grid. The system studies and stores a travelling range to be used and guides the robot through a travel pattern within the specified range by sequentially moving the robot back and forth along one of the columns and rows of the map and shifting the robot to other columns and rows. In response to the detection of an obstruction, the robot shifts to the next column and row by turning the robot at the point where the obstruction is sensed. In this way, the robot travels within the defined range, without leaving any area untravelled, while obstructions are recognized and the robot's course is altered in response to those obstructions.

U.S. Pat. No. 5,440,216 relates to a mobile robot cleaner which initially follows the walls of a room to be cleaned to note their location and, thereby, establish the configuration and size of the room. The cleaner's control system then compares this information with data previously stored to select a control program for a room that is the most like to the room to be cleaned. The cleaner then performs the cleaning operation according to the selected program, moving in parallel lines within the configuration of the room that the robot has established.

International Patent Application WO 99/59402 discloses a robot that has a sensor unit and a navigation system. The sensor unit senses the proximity of the robot to markers located along the outer boundary of an area or field of operation to be covered. The navigation system guides the robot, generally, in straight, parallel lines and causes the robot to turn when it encounters a boundary marker.

International Patent Application WO 00/38025 discloses an autonomous floor-cleaning device arranged so that it first traverses the boundaries of a room and, thereafter, moves inward and completes a second circuit of the room. The device continues to move further inward after each circuit it makes until the room, apart from areas occupied by obstacles, has been cleaned, the entire cleaning path, generally, defining an inwardly, spiraling pattern of movement.

Although the above strategies can be used with satisfactory results, the efficiency with which they are implemented is less than desired in most practical cases, particularly where there are obstacles of various sizes and forms present that constantly interrupt the nominal path of the autonomous apparatus. In particular, the strategy of moving the autonomous apparatus back and forth, generally, in straight, parallel lines will be disrupted in environments where elongated obstacles are present, especially when some of the elongated obstacles are arranged perpendicularly to the movement of the apparatus.

Consequently, there remains a need for an efficient and effective strategy for navigating an autonomous surface-treatment apparatus over a given field of operation.

RELATED ART

U.S. Pat. No. 5,006,988 discloses a navigation system for guiding an autonomous device through a field of operation while avoiding collisions with obstacles. The system utilizes a memory for the storage of data that defines an array of grid cells which corresponds to respective subfields in the field of operation. Each grid cell is assigned a value that is indicative of the probability that an obstacle is present in the associated subfield. The subfields are scanned for determining the presence of an obstacle therein, and the value of each grid cell is incrementally adjusted in response to each scan of the subfields. Furthermore, a region of operation in the vicinity of the vehicle is defined and a plurality of vectorial values are computed, based on the location of the grid cells within the defined region of operation with respect to the location of the vehicle and the values of the relevant grid cells. Finally, a resultant guide vector is produced based on the vectorial values and that vector can be used in guiding the vehicle through the field of operation in a manner to avoid collisions.

U.S. Pat. No. 5,684,695 and International Patent Application WO 98/00767 disclose various improvements relating to the so-called occupancy levels in the cells of a cellularly structured map of the field of operation for providing navigation in a manner intended to avoid obstacles.

International Patent Application WO 00/10062 discloses a method and device for determining a path around a defined reference position. The path is determined by iteratively determining an arc-shaped path around the reference position at a defined distance therefrom, and verifying the absence of obstacles along the arc-shaped path. As long as no obstacles are detected, the path is extended. However, if an obstacle is detected, the distance is increased by a given value and the process of determining a different arc-shaped path is repeated using the increased distance.

International Patent WO 99/40496 discloses a path-planning process for an autonomous cleaner wherein potential path sections are first generated as concentric circles. The path sections are then subdivided and evaluated by means of a cost function employing selected variables. The intention is that the most cost-effective path be defined.

SUMMARY OF THE INVENTION

It is a general object of the present invention to provide an efficient strategy for navigating an autonomous carrier or vehicle over a field of operation.

The present invention represents a new approach for navigating an autonomous carrier or vehicle, such as an autonomous surface-treatment apparatus, over a field of operation. The navigation proceeds in a manner such that, of a number of locations in the field of operation where the treatment procedure is to be executed, the apparatus is directed to the location which can be preferentially accessed by the apparatus based on a defined criterion. Generally, according to the invention, the field of operation is divided into two-dimensional cells which are distinguished on the basis of cells that have been treated, cells that are untreated and cells that are occupied by an obstacle. A navigation route then is determined to the specific obstacle-free and untreated cell that can be preferentially accessed by the carrier based on a defined criterion. For example, the criterion may be the requirement that the carrier expend the least amount of energy in moving to an untreated and obstacle-free cell, according to a predetermined energy-cost formulation. The autonomous apparatus is guided to the obstacle-free and untreated cell according to the determined navigation route, the cell is treated, and the status of that cell is changed from untreated to treated. Preferably, the methodology is repeated until the treatment procedure has been executed in all the cells in the field of operation that are to be treated. In this way, where the criterion has as an objective the use of the least amount of energy in moving to an untreated cell, and a proper energy-cost formulation is employed, the energy consumed by the carrier in moving over a given field of operation will be minimized.

Insofar as the energy-cost formulation is concerned, preferably, it will take into account both the distance to an untreated cell from the cell in which the apparatus is located, as well as the total change of direction the apparatus undergoes in its movement to the untreated cell, a larger distance and a greater change in direction, each, being assigned a greater cost. It, therefore, is important to maintain the number of rotations of the apparatus to a minimum since no useful work is performed by the apparatus when it rotates in place.

Also according to the invention, the task of determining a navigation route to a location that can be preferentially accessed is based on an efficient, structured search procedure of low computational complexity. Advantageously, the search procedure can involve the allocation of costs to a number of cells surrounding the cell in which the surface-treatment apparatus is located. The allocation to each cell is made based on the distance, as well as the number of changes of direction required for the apparatus to move to the cell. In general, the cells are examined in cost-order starting with the cell having the lowest cost and continuing, as necessary, until a cell requiring treatment is found. The route from the apparatus to the found cell is extracted as the lowest-cost navigation route and the autonomous surface treatment apparatus is navigated or directed from its existing location to the untreated cell according to the extracted navigation route. Each cost-allocated cell is conveniently assigned a direction indicator to enable extraction of the lowest-cost route by means of back tracing. Once the untreated cell has been treated by the autonomous apparatus, the status of the cell is updated to that of a treated cell.

Examining the cells in cost-order ensures that the lowest-cost route will always be found, and keeps the computational complexity of the search procedure low. Using a procedure of low computational complexity is of importance in minimizing the capacity requirements of the memory and processor that are used in the invention.

In accordance with one aspect, the invention relates to the navigation of an autonomous carrier for executing a selected procedure at more than one location on a surface or field of operation, the autonomous carrier being equipped with the implements required to execute that procedure. Initially, an indication of the locations at which it is desired to execute the procedure is provided. The location, among those indicated locations, that can be preferentially accessed by the carrier from its existing position, based on a defined criterion, is then determined. Thereafter, the carrier is directed from its existing position to that location, or, if more than one location can be equally, preferentially accessed, the carrier is directed to a predetermined one of those locations. The selected procedure is then executed at the directed location, and an indication of the remaining locations at which the procedure is to be executed is provided. Thereafter, the determining, directing and executing operations are performed, seriatim, for the remaining locations until the selected procedure has been executed at all desired locations.

In accordance with another aspect, an indication of the locations at which it is desired to execute the procedure is provided by first subdividing the field of operation into a two-dimensional grid of equal-sided cells. The cells are then distinguished on the basis of cells in which the procedure is to be executed, cells in which the procedure is not to be executed, and cells which contain an obstacle. Following the execution of the procedure in a particular cell, the designation of the cell is changed to that of a cell in which the procedure is not to be executed.

In accordance with yet another aspect, the defined criterion is represented by a formulation having variables which produce a numeric value for each cell indicative of that cell's preferential accessibility to the carrier. The determination of which cells, in which the procedure is to be executed, can be preferentially accessed is accomplished by identifying those cells having a numeric value equal to the numeric value which represents the greatest degree of preferential accessibility, evaluating whether any of the identified cells constitutes a cell in which the procedure is to be executed and specifying any such cell as the cell to which the carrier is to be directed. If no such cell is specified, the numeric value which represents the greatest degree of preferential accessibility is incrementally adjusted to a new numeric value which represents an incrementally lesser degree of preferential accessibility. At that point, those cells having a numeric value equal to the new numeric value are identified, whether any of the identified cells constitutes a cell in which the procedure is to be executed is evaluated, and any such cell is specified as the cell to which the carrier is to be directed. If no such cell is specified, the new numeric value is incrementally adjusted to a numeric value which represents an incrementally lesser degree of preferential accessibility. Thereafter, the foregoing operations are continued to be performed, seriatim, until a cell is specified as the cell to which the carrier is to be directed.

In accordance with still another aspect, the defined criterion is represented by a formulation having variables which produce a numeric result for each cell indicative of that cell's preferential accessibility to the carrier. The determination of which of the cells, in which the procedure is to be executed, can be preferentially accessed is accomplished by first assigning each cell in edge-to-edge contact with the cell in which the carrier is positioned to a respective list of cells having equal numeric values. A first evaluation is performed of whether any of the cells in the list of cells having a numeric value representative of the greatest degree of preferential accessibility is a cell in which the procedure is to be executed. Any such cell is specified as the cell to which the carrier is to be directed. If no such cell is specified, the list of cells from the first evaluation are removed from further consideration. Next, each cell in edge-to-edge contact with the cells included in the first evaluation is assigned to a respective list of cells having an equal numeric value. At that point, a second evaluation is performed of whether any of the cells in the list of cells having a numeric value representative of a degree of preferential accessibility incrementally less than that of the cells in the first evaluation is a cell in which the procedure is to be executed. Any such cell is specified as the cell to which the carrier is to be directed. If no such cell is specified, the foregoing operations are continued to be performed, seriatim, until a cell is specified as the cell to which the carrier is to be directed.

In accordance with a further aspect, the defined criterion comprises the determination of the least cost of energy required for the carrier to access a cell at which it is desired to execute the procedure, and unit-cost values are assigned for the primary carrier functions of moving forward one cell and rotating 90 degrees.

In accordance with another aspect, the invention includes the preliminary operation of determining the locations of the boundaries of the field of operation and any obstacles on the surface, and applying that information in determining which of the locations can be preferentially accessed by the carrier from its existing location. In accordance with still another aspect, the invention involves following this preliminary operation by executing the selected procedure over the bounded surface in accordance with a pre-programmed plan. Thereafter, locations on the surface which did not undergo the selected procedure during the performance of the pre-programmed plan are established as locations at which it is desired to execute the selected procedure.

In accordance with a further aspect, the invention is effected by means of a computer program which is executed by a computer arranged to control the operation of the carrier.

In accordance with another aspect, the carrier constitutes a vacuum cleaner and the selected procedure constitutes vacuuming of the surface.

The invention offers the following advantages among others: Efficient navigation over a given field of operation; minimization of the number of rotations of the carrier in its path of travel; a structured and efficient search for untreated areas; low-computational complexity, requiring fewer demands on memory and processor capacity.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
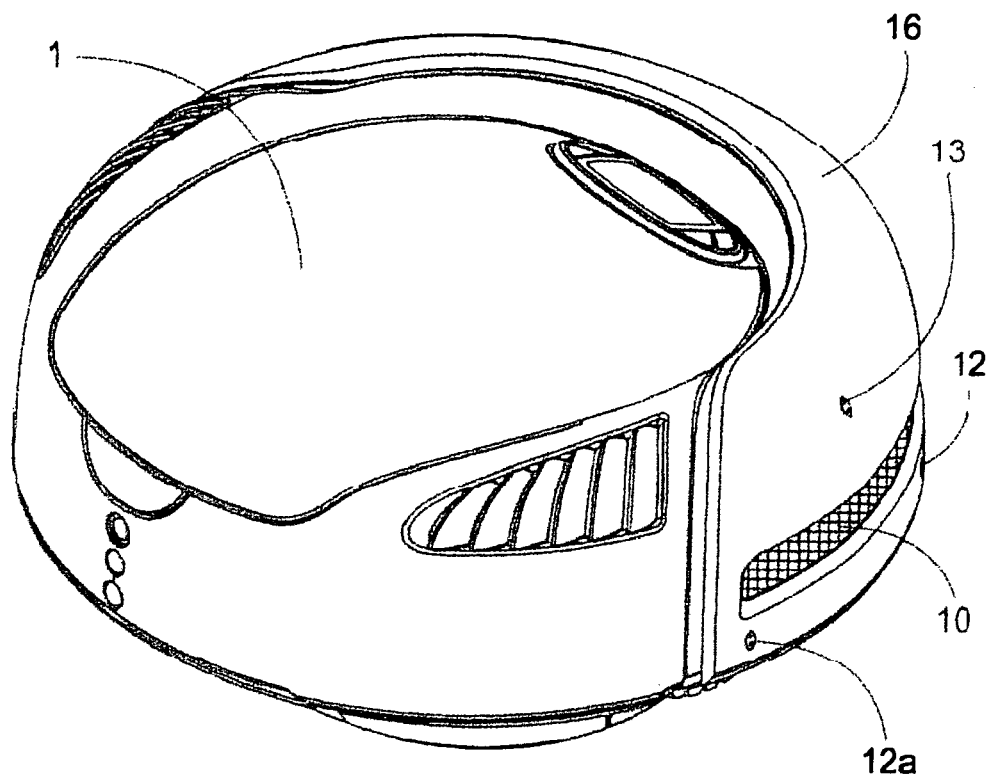
FIG. 1 is a three-dimensional top view of an embodiment comprising an autonomous vacuum cleaning robot equipped according to the present invention.

In the following, the invention will be described with reference to a particular example of an autonomous surface treatment apparatus, namely, an autonomous vacuum cleaning device. It should be understood, however, that the invention is not limited thereto and that the invention is applicable to various types of autonomous carriers or vehicles equipped to execute a selected procedure in a field of operation, such as autonomous devices for sweeping, brushing and polishing floors, as well as devices for mowing lawns. Throughout the drawings, the same reference characters are used for corresponding or similar elements.

General Features

Figure 2:
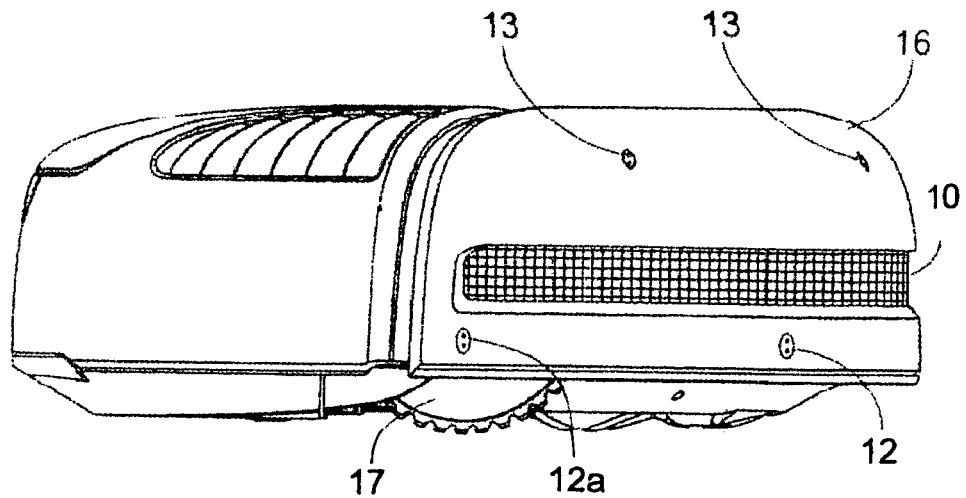
FIG. 2 is a side view of the autonomous device shown in FIG. 1.
Figure 3:
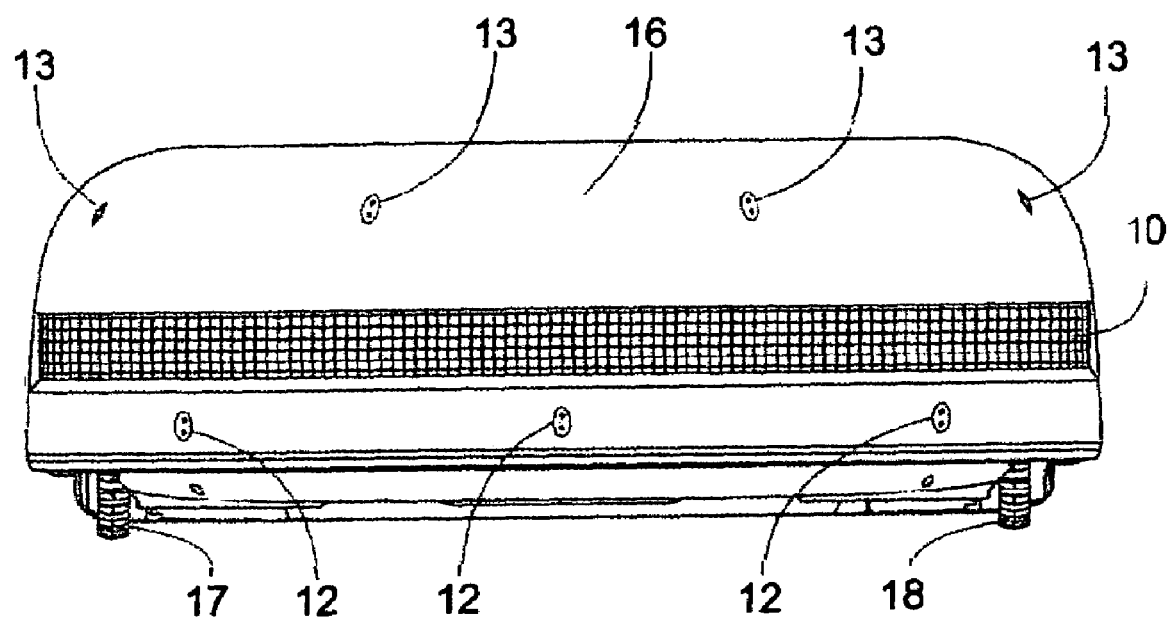
FIG. 3 is a front view of the autonomous device of FIG. 1 illustrating a transmitter member and two rows of receiving sensors at the front of the device.

FIG. 1 depicts in a three-dimensional top view, an illustrative embodiment of an autonomous vacuum cleaning device 1, which, under its own power, will move over a floor and vacuum clean a room. At the front of the device there is arranged an ultrasonic system comprising an ultrasonic transmitter 10 and ultrasound, echo-sensor microphone units 12 and 13. The ultrasonic transmitter 10 is strip-shaped and is of a length covering approximately 180 degrees of the perimeter of the device, as illustrated in FIGS. 2 and 3. As seen in FIG. 2, the transmitter 10 is mounted above a lower, first row of ultrasound, echo-sensor microphone units 12 and below an upper, second row of ultrasound, echo-sensor microphone units 13. The ultrasonic sonar system, formed by the transmitter 10 and the microphone units 12 and 13, aids in the navigation of the device as it traverses the floor of an area to be vacuumed. In the illustrative embodiment, the transmitter is countersunk in a forward-directed bumper unit 16. The bumper 16 controls a left and a right bumper touch sensor 12a, either one being actuated if the bumper makes contact with an obstacle. Alternatively, the bumper 16 can take the form of the bumper disclosed in International Patent Application WO 02/067745.

From FIGS. 2 and 3, it will be seen that the device has two diametrically positioned wheels 17 and 18. Each wheel is independently driven by a separate motor, preferably equipped with a gearbox. The driving wheels 17 and 18, in addition to constituting the means by which the device traverses the surface to be vacuumed, will enable the device to rotate around its own center of symmetry. On the axle or shaft from each motor driving a respective wheel 17 or 18, a quadrature sensor is mounted. Quadrature signals from the sensors are received by a built-in microprocessor controlling the device. The signals from these sensors, or equivalent devices, are used for obtaining a dead count for determining the distance the device has travelled. Optional wheels can be provided to support the rear of the device. The device is generally balanced with a slightly larger weight on its rear half which carries, for instance, the batteries for driving the motors for the wheels 17 and 18. As a result, the device is more likely to move with all its wheels in contact with the surface over which it traverses and it will easily pass over the edges of floor carpets and the like.

The autonomous device may advantageously be equipped with Hall-effect sensors, one being located in front of each wheel 17 and 18, for the detection of a magnetic fence and/or one or more magnetic strips. Magnetic fences and magnetic strips are used to restrict the movement of the device. For example, a fence can be placed in front of a stairway so that the device does not fall down the stairs. A fence can also be placed in a doorway so that the movement of the device can be confined to one room, without having to close the door between the rooms. Thus, it is possible to clean one room at a time, which is an effective way of cleaning. Magnetic strips can be located adjacent to an automatic charging station in a manner so that the device may appropriately position itself in order to have its batteries recharged.

Figure 4:
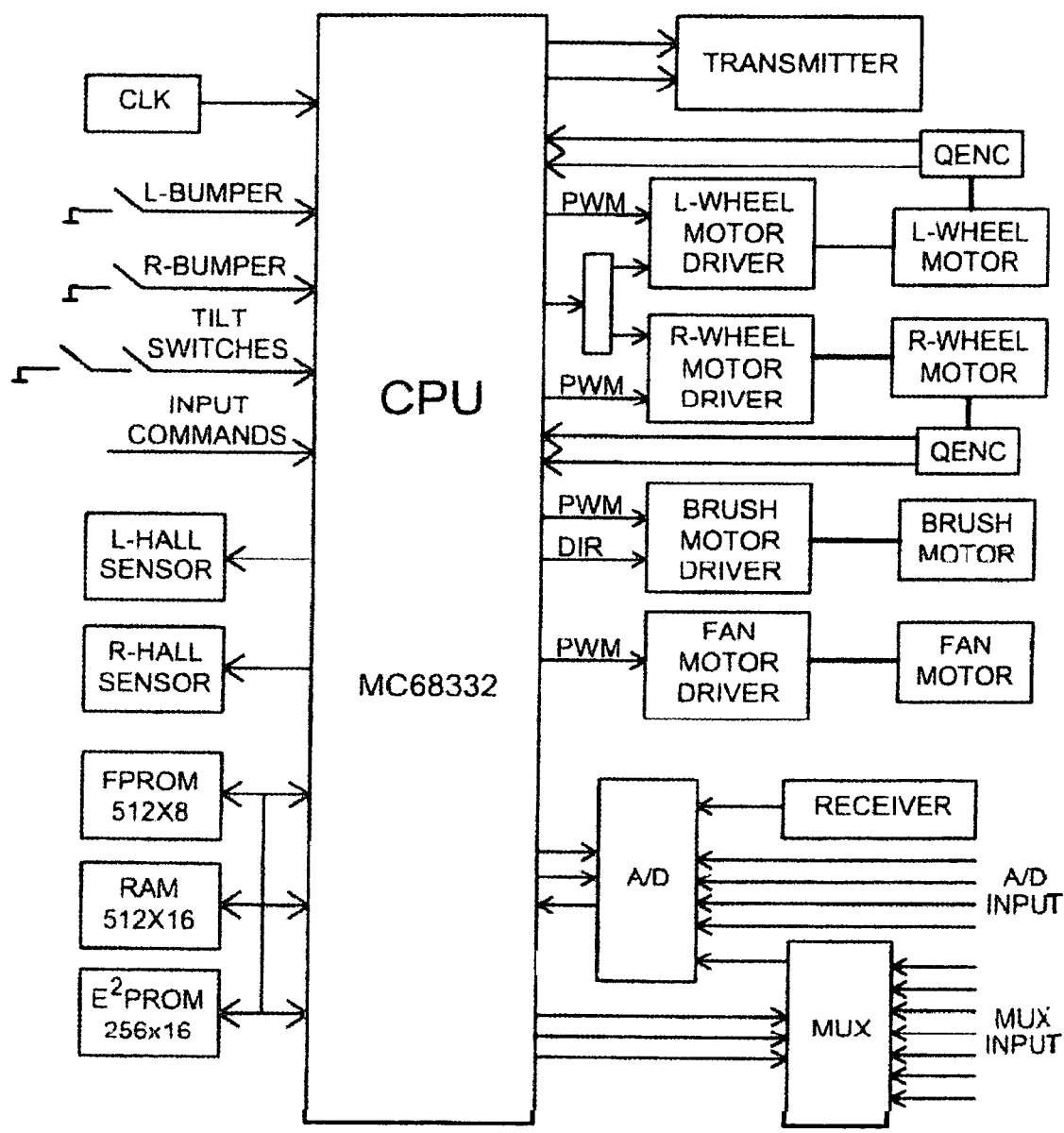
FIG. 4 is a block diagram of the hardware that controls the operation of the device illustrated in FIG. 1.

FIG. 4 is a block diagram of the hardware which controls the operation of the device described in FIGS. 1, 2 and 3. The hardware, basically, consists of a processor board, which is configured to drive the two wheel motors; the ultrasonic transmitter, together with the corresponding ultrasound echo-sensor microphone units; and the fan and brush motors, as well as other components of the autonomous vacuum cleaning device. The processor board is essentially built around a main data processor or central processing unit (CPU) such as the MC68332 from Motorola Inc. The MC68332 is a highly-integrated microcontroller that combines data manipulation capabilities with peripheral subsystems.

The wheel motors are separately controlled by pulse-width modulated (PWM) signals of 5 kHz, generated by channels from the Time Processor Unit (TPU) in the CPU. In order to detect the number of times each wheel has rotated, the quadrature encoders (QENC) mounted in connection with the wheel motors generate quadrature signals that are connected to TPU inputs of the MC68332. The quadrature signals are processed by the CPU to provide information as to the position of the device by keeping track of the distance the device has travelled and, preferably, also the extent to which the autonomous device has rotated during movement. The processor (running in quadrature decode (QDEC) mode) gives such position information with an accuracy of 2642 slots per revolution.

The sonar system, formed by the transmitter and microphone units, is utilized for obstacle detection purposes, such as the detection of obstacles in the path of the device as it moves, and the pinpointing of the nearest obstacle. The main processor controls the transmitter and receives input data from the microphone units for subsequent evaluation.

The processor also controls the motor for the vacuum cleaner's rotating brush, as well as the motor for the cleaner's fan which generates the necessary vacuum for the functioning of the vacuum cleaner. Air from the fan motor is, additionally, in a known manner, utilized for cooling purposes, with the air being exhausted through a grilled outlet at the top of the cleaner.

The main processor is controlled by software stored in a number of different types of digital memories, for example, FPROM, RAM or $E^2$PROM, which are all well known to a person familiar with the computer art. Additionally, the processor has its own clocking system (CLK) also known from the prior art.

The system, as illustrated in FIG. 4, further comprises two bumper switches and two tilt switches. The two bumper switches, L-Bumper and R-Bumper, are connected to two TPU input pins working in a discrete input/output (I/O) mode and are used, as a complement to the sonar system, for the detection of collisions with obstacles. The tilt switches are used to detect whether the device is level with respect to the floor or at an angle to it.

The system also includes a number of switches for input commands from a control panel. This enables the user, for example, to turn the vacuum cleaner on and off, and to select one of a number of cleaning programs to be executed by the cleaner.

Signals representative of the magnetic fields that are sensed by the Hall sensors are fed to the main processor via the analog to digital (A/D) converter and processed to allow the detection of an automatic charging station where a magnetic fence or magnetic strips have been installed. The offset voltages of the analogue Hall sensors may vary with time, temperature and individual sensors, and, therefore, a zero-field reference point is constantly recalculated and adjusted with a slow averaging filter and adjusted based on pulse width modulated signals from the main processor.

In order to detect malfunctions, various signals are continuously measured and fed to the main processor for evaluation, either directly from the A/D converter or first through the multiplexer (MUX).

Cost-Based Navigation According to the Invention

The invention is preferably, although not necessarily, implemented as software in the form of computer program modules, functions or the equivalent stored in appropriate memories. The software may be written in any type of computer language, such as C, C++, Java or even specialized proprietary languages. In practice, the steps, functions and actions to be described are mapped into a computer program, which when executed by the main processor or computer, carries out the navigation of the autonomous vacuum cleaner in accordance with the invention.

The autonomous vacuum cleaner, basically, operates in the following manner. In order to traverse a given area to be cleaned, the wheels of the vacuum cleaner are driven by the wheel motors under the control of the main processor, while the fan and brush motors are operated to perform the cleaning task. The movement of the vacuum cleaner is determined, generally, by computing means including control software executed by the processor in response to position information, and information from the sonar system concerning the location of obstacles. Preferably, the vacuum cleaner begins its operation by making a wall-tracking excursion around the room to be cleaned. This allows the processor to produce a general map of the room and identify the location of the walls and obstruction or obstacles as they are detected during the tracking excursion.

According to a basic embodiment of the invention, following the tracking phase, means comprising the control software divides the area covered by the map, or, if desired, a predetermined part thereof, into two-dimensional cells and distinguishes those cells on the basis of cells in which the procedure is to be executed, cells in which the procedure is not to be executed and cells which contain an obstacle. The control software, also, changes the designation of a cell from one in which the procedure is to be executed to one in which the procedure is not to be executed following the execution of the procedure in the cell. Thereafter, as the vacuum cleaner is navigated over the given field of operation, the control software continuously keeps track of which cells have been treated, which remain untreated and which are occupied by obstacles.

With the vacuum cleaner positioned in a given cell, the navigation system determines a route to an obstacle-free and untreated cell, and the cleaner is directed and moves to that cell where it performs its cleaning function. This procedure is accomplished with the aid of a computing means for identifying those locations on the field of operation at which it is desired to execute the procedure, for determining which of the locations can be preferentially accessed by the cleaner for an existing position on the field based on a defined criterion and for directing the carrier to the location determined to be preferentially accessible. Once the cell has been cleaned, the cell is indicated as treated, and a navigation route to another obstacle-free and untreated cell is determined. By defining an energy cost function for the operation of the vacuum cleaner, it is possible to determine a navigation route to the particular untreated cell that requires the expenditure of the least amount of energy in relation to all the other obstacle-free and untreated cells.

It has been recognized that the energy consumption of an autonomous surface treatment apparatus during treatment of a given field of operation, generally, is not only dependent on the distance travelled by the computer as it proceeds from one location to another but, also, is dependent on the number of times the apparatus rotates in its course of travel. Therefore, an acceptable energy cost function, as applied to the presently preferred embodiment of the invention, is based both on the distance to be travelled by the cleaner to an obstacle-free and untreated cell and on the total change of direction required for the cleaner to move to that cell, with a larger change of direction and a larger distance, each, being assigned a larger cost.

Cost-based navigation according to a first embodiment of the invention will now be described in relation to a particular example by referring to FIGS. 5,6A–D and 7.

Figures 5, 6A, 6B, 6C, 6D:
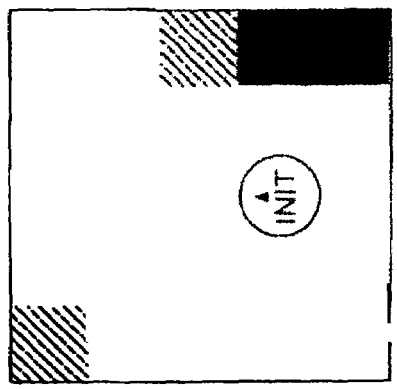
FIG. 5 is a schematic drawing of a predetermined field of operation and a corresponding cell-based map.
FIGS. 6A–D are schematic drawings of search maps at different stages during the search for an untreated cell according to one embodiment of the invention.
Figure 7:
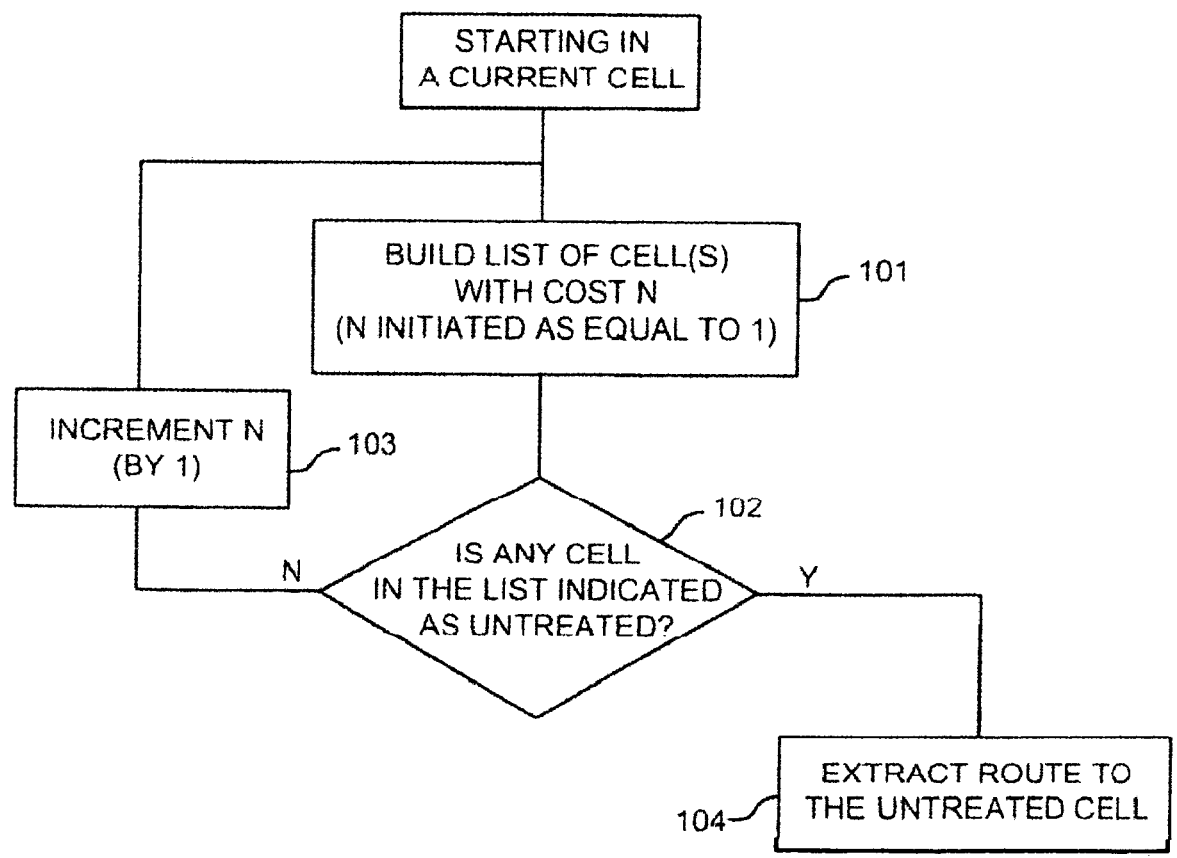
FIG. 7 is a schematic flow diagram of a search procedure according to an illustrative embodiment of the invention.

FIG. 5 includes, on the left, a schematic drawing of a predetermined field of operation and, on the right, a corresponding cell-based map. As can be seen in the drawing on the left, the vacuum cleaner is located in an initial position, INIT, with an obstacle (in black) in the lower right-hand corner and uncleaned areas (in diagonal lines) directly above and abutting the obstacle and, also, in the upper left-hand corner. In the cell-based map, each cell is indicated as treated, untreated or occupied by an obstacle. Thus an indication of the locations at which it is desired to execute the procedure of vacuuming the surface is provided by the computing means of the invention. In this example, treated cells are indicated by the integer 200, while untreated cells are indicated by the integer 201. Obstacles of any kind are indicated by the integer 255. The obstacle will have been detected by the sonar system of the vacuum cleaner, and the fact that there are two cells, one above the obstacle and one in the upper left corner of the field of operation, that have not been treated by the vacuum cleaner will have been determined and inputted and stored in the software.

The task is to determine which of the untreated locations can be preferentially accessed by the carrier from its existing position based on a defined criterion. Specifically, in the described embodiment, the task is to find the most cost-effective navigation route from the vacuum cleaner to an untreated cell. This is preferably accomplished by a structured search procedure by the computing means of the invention that involves an allocation of costs to the cells based on the distance between the cleaner and each of the cells as well as any changes of direction the cleaner would have to make in moving to each of the cells.

For example, considering only the four cardinal directions (forward, 90 degrees to the left, 90 degrees to the right and backward), it may be assumed that the cost to drive forward one cell is 1 unit, and the cost to turn 90 degrees is 1 unit. Thus, the energy cost function E for any particular path of travel is defined by accumulating the costs of all forward cell-to-cell movements and all 90-degree rotations required to reach a given cell. This energy cost function is expressed in the following formula:

$$E = \sum_i C_i^{forward} + \sum_j C_j^{rotation},$$

where $C^{forward}$ is the cost of driving forward one cell and $C^{rotation}$ is the cost of turning 90 degrees. Of course, these assumptions are not completely accurate, but they do afford a good estimate of the total energy cost to reach a specific location. The search algorithm to implement the formula may be based on the question of whether there is an untreated cell with cost N, where N starts at 1 and is increased incrementally by 1 for each subsequent iteration of the question.

Following the step of providing an indication of the locations at which it is desired to execute the procedure, as by the creation of the cell-based map of FIG. 5, the foregoing formula is applied and a list of cell(s) is generated that have a numeric value of N (step 101 in FIG. 7) and are located around the cell in which the cleaner is located are identified by means included in the computing means. Thereby, a determination of which cells may be preferentially accessed by the carrier, based on the formula, is made. When a cell is added to a list, the corresponding cost, preferably, is stored in a search map together with, by means of a direction indicator, the direction from which the vacuum cleaner would come, pursuant to the search algorithm, to reach the cell at that cost.

Initially, the value of N is set to 1 which is the value that represents that greatest degree of preferential accessibility. Accordingly, the first list that is created contains the coordinates for all cells with a cost of 1. In the described embodiment, this list contains a single cell, since the only operation that allows another cell to be reach for a cost of 1 is driving forward one cell. FIG. 6A shows the search map at this stage. The cell having a cost of 1 is then evaluated or examined by means included in the computing means to determine whether the cell constitutes a cell in which the vacuuming procedure is to be executed or whether the cell is untreated (step 102 in FIG. 7). From the cell-based map of FIG. 5 it can be seen that the cell has been treated, and, therefore, it is not specified as a cell to which the carrier is to be directed. Consequently, N is incrementally adjusted by 1 (step 103 in FIG. 7) by means included in the computing means and the procedure continues by the creation of a list of cells having a new numeric value representing a cost of 2 (step 101). The cost of 2, of course, represents an incrementally lesser degree of preferential accessibility for the cleaner than a cost of 1. FIG. 6B shows the search map at this stage. The cells in the list having a cost of 2 are examined or evaluated to determine whether any of these cells are untreated and whether any should be specified as the cell to which the carrier is to be directed (step 102). The cell-based map of FIG. 5 indicates that no cell in the list of cells having a cost of 2 is untreated. As a result, N is incremented once again (step 103), and a list with cells having a cost of 3 is created (step 101). FIG. 6C shows the search map at this stage. The presence of the obstacle prevents the allocation of cost 3 to the cell located two cells to the right of the cell in which the cleaner is located. The cells in the list of cells having a cost of 3 are then examined (step 102). Since no cell in this list is untreated, N is incremented once again (step 103). This time, a list of cells having a cost of 4 is created (step 101) and examined (step 102). FIG. 6D shows the search map at this stage. In this case, an untreated cell is found directly above and abutting the obstacle, and the corresponding lowest-cost route is extracted (step 104 in FIG. 7) using the direction indicators and the cleaner is directed to that cell. After the cell is vacuumed, the cell-based map in FIG. 5 is updated to indicate that the cell has been treated and that the cleaner is located in that cell. Thereafter, the procedure is repeated, based on the new location of the cleaner, until the cell in the upper left-hand corner of the field of operation is identified as the cell that is preferentially accessible to the cleaner. The cleaner is directed to that cell by the computing means of the invention, and the cell is vacuumed to end the vacuuming operation.

Thus, the most cost-effective way, according to the above energy cost assumptions, is UP, RIGHT, RIGHT. Using cells with a resolution of 30 cm. (corresponding to the effective size of the vacuum cleaner), the route can be converted into the following drive vectors: drive forward 30 cm. and stop; make a right 90 degree turn; and drive forward 60 cm. The size of the cells can, of course, be modified and a resolution, for instance, of 10 cm. or 20 cm. may be appropriate even if the effective size of the vacuum cleaner is 30 cm.

As will be understood from the foregoing description, the procedures required to identify a cell to which the carrier is directed will continue to be performed, seriatim, until such a cell is specified.

In the following case, the implementation of a different search procedure is described with reference to FIGS. 8 and 9A–D.

Figures 8, 9A, 9B, 9C, 9D:
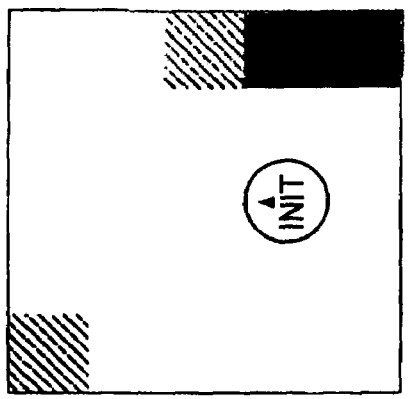
FIG. 8 is a schematic drawing of a predetermined field of operation and a corresponding cell-based map similar to FIG. 5.
FIGS. 9A–D are schematic drawings of search maps at different stages during the search for an untreated cell according to a second embodiment of the invention.

It is assumed that the autonomous vacuum cleaner is located in the same field of operation as described in connection with FIG. 5, and, therefore, FIG. 8 is identical to FIG. 5. Again, the task is to find the most cost-effective navigation route the vacuum cleaner can take to an untreated cell, assuming that the cost to drive forward one cell is 1 unit, and the cost to turn 90 degrees is 1 unit. Also as before, the search algorithm is based on the question whether there is an untreated cell with cost N, where N begins at 1 and is increased incrementally from iteration to iteration by units of 1.

The search procedure is initiated by means included in the computing means creating three lists for the cells that are in edge-to-edge contact with the cell in which the cleaner is positioned, i.e., the cells that are immediately forward, rearward, to the left and to the right of that cell. Application of the formulation described above produces for those cells numeric values representative of each cell's preferential accessibility to the vacuum cleaner. The cells then are assigned to a respective list of cells having equal numeric values. Thus, the first list contains the coordinates of the cell with a cost of 1, reached by driving forward 1 step. In the same way, lists with cells having a cost of 2 and a cost of 3 are created. FIG. 9A illustrates the search map after the creation of these three lists.

The lists are processed one by one in cost-order, starting with the list having the lowest cost. In that way, a first evaluation is made of whether any of the cells in the list of cells having a numeric value representative of the greatest degree of preferential accessibility is a cell in which the cleaning procedure is to be executed. The processing consists of examining the cells one by one to see whether any cell is untreated, as described in the search procedure set forth above. However, in this different procedure, during the processing of a given list, new cells are also added to the existing lists of higher costs and new lists of even higher costs are created by evaluating, for each cell in the list under process, the cells that are in edge-to-edge contact with it.

For example, starting with the first list, as illustrated in FIG. 9A, the cell having a cost of 1 is evaluated with respect to whether or not the cell is untreated. From the cell-based map of FIG. 8 it can be seen that the cell has been treated. Consequently, the cell is removed from further consideration. Thereafter, each cell in edge-to-edge contact with the cell from the first evaluation is assigned to a respective list of cells having an equal numeric value. Thus, the lists of cells having a cost of 2 or 3 are updated based on the cells which are in edge-to-edge contact with the cell having a cost of 1. From the cell having a cost of 1, it is possible to proceed in a forward direction, or to turn to either side of the cell. The cost of driving forward one cell is 1 unit, while the cost of first turning 90 degrees and then proceeding forward one cell is 2 units. Accumulating the costs from the starting cell, where the vacuum cleaner is located, results in the cell lying in the forward direction from the cell having a cost of 1 being allocated a total cost of 2 and being added to the list of cells having a cost of 2. On the other hand, each of the cells to the left and to the right of the cell having a cost of 1 are allocated a total cost of 3 and are added to the list of cells having a cost of 3. The search map, after processing the list with cells having a cost of 1 is illustrated in FIG. 9B. Once, the list of cells having a cost of 1 has been processed and the lists of cells having costs of 2 and 3, respectively, have been updated, the list of cells having a cost of 1 is discarded. The search procedure continues by the performance of a second evaluation of whether any of the cells in the list of cells having a numeric value representative of a degree of preferential accessibility incrementally less than that of the cells in the first evaluation is a cell in which the procedure to be executed. In the described embodiment, this constitutes an evaluation of the cells the list of cells having a cost of 2.

In the same way as before, the cells having a cost of 2 are evaluated one by one to determine whether any cell is untreated. As can be seen from the cell-based map of FIG. 8, all cells having a cost of 2 have been treated. During this evaluation procedure of the list of cells having a cost of 2, cells are added to the list of cells having a cost of 3 and a new list consisting of cells having a cost of 4 is created. The search map after processing of the list of cells having a cost of 2 is illustrated in FIG. 9C.

As will be understood, the steps of the described procedure are continued to be performed, seriatim, until a cell is specified as the cell to which the carrier is to be directed. Thus, the procedure continues with the evaluation one by one of the cells included in the list of cells having a cost of 3.

With reference to the cell-based map of FIG. 8, it can be seen that all cells having a cost of 3 have been treated. Consequently, after the list of cells having a cost of 4 has been updated and a new list of cells having a cost of 5 has been created, the list of cells of cost 3 is discarded and the procedure continues with the list of cells having a cost of 4. When the cell of cost 4 located directly above and in contact with the obstacle is evaluated, an untreated cell is specified by means included in the computing means and the search is completed (FIG. 9D). Finally, the route to that cell is extracted as the lowest-cost route to an untreated and obstacle-free cell and the cleaner is directed to that cell and the cell vacuumed. The cell-based map is then updated to indicate that the cell has been treated and the cleaner is now located in that cell. The foregoing procedure is resumed based on the new location of the cleaner and the updated cell-based map until the cell in the upper left-hand corner of the field of operation is identified as preferentially accessible and is vacuumed.

Although it has been assumed that the cost to drive forward one cell is 1 unit, and the cost to turn 90 degrees is 1 unit, it is apparent that these assumptions can be modified in various ways. For example, the relationship between the cost of driving forward one cell and the cost of turning 90 degrees can be changed. It is also possible to assign costs for turning in other directions as well. It should also be understood that the costs do not have to be integer values and that any real values can be assigned to represent the costs of driving forward and turning in different directions.

It is apparent that the cost-based navigation method of the invention can be used for cleaning entire rooms or rather large selected sections or portions of rooms in an energy-efficient way. However, it should be understood that the invention is also effective for so-called "spot cleaning," or the cleaning of a smaller area within a room. It is also possible to combine the cost-based navigation method of the invention with any of the prior art techniques. For example, following a tracking excursion to locate the boundaries of the field of operation and any obstacles in the field, vacuuming of a room may be initiated by utilizing a pre-programmed pattern of movement of the vacuum cleaner as taught in the prior art. Thereafter, vacuuming can be concluded applying the cost-based navigation method of the invention for areas and spots that the pre-programmed cleaning operation did not reach.

An illustrative example of how an autonomous vacuum cleaner navigates according to the invention to perform spot-cleaning of a smaller area within a room will now be described with reference to FIGS. 10 and 11A–P.

Figures 10, 11A, 11B:
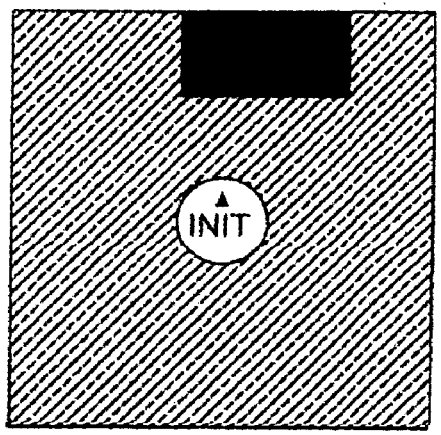
FIG. 10 is a schematic drawing of a particular area to be treated in accordance with the invention.
FIGS. 11A–P are schematic drawings of cell-based maps during navigation of an autonomous device over a given area to be cleaned, together with corresponding search maps.

FIG. 10 is a schematic drawing of a given cleaning area. The vacuum cleaner is positioned in the middle of the area, with an obstacle (black) located forwardly of the cleaner. Initially, the entire area is uncleaned (diagonal lines).

Figures 11C, 11D, 11E:
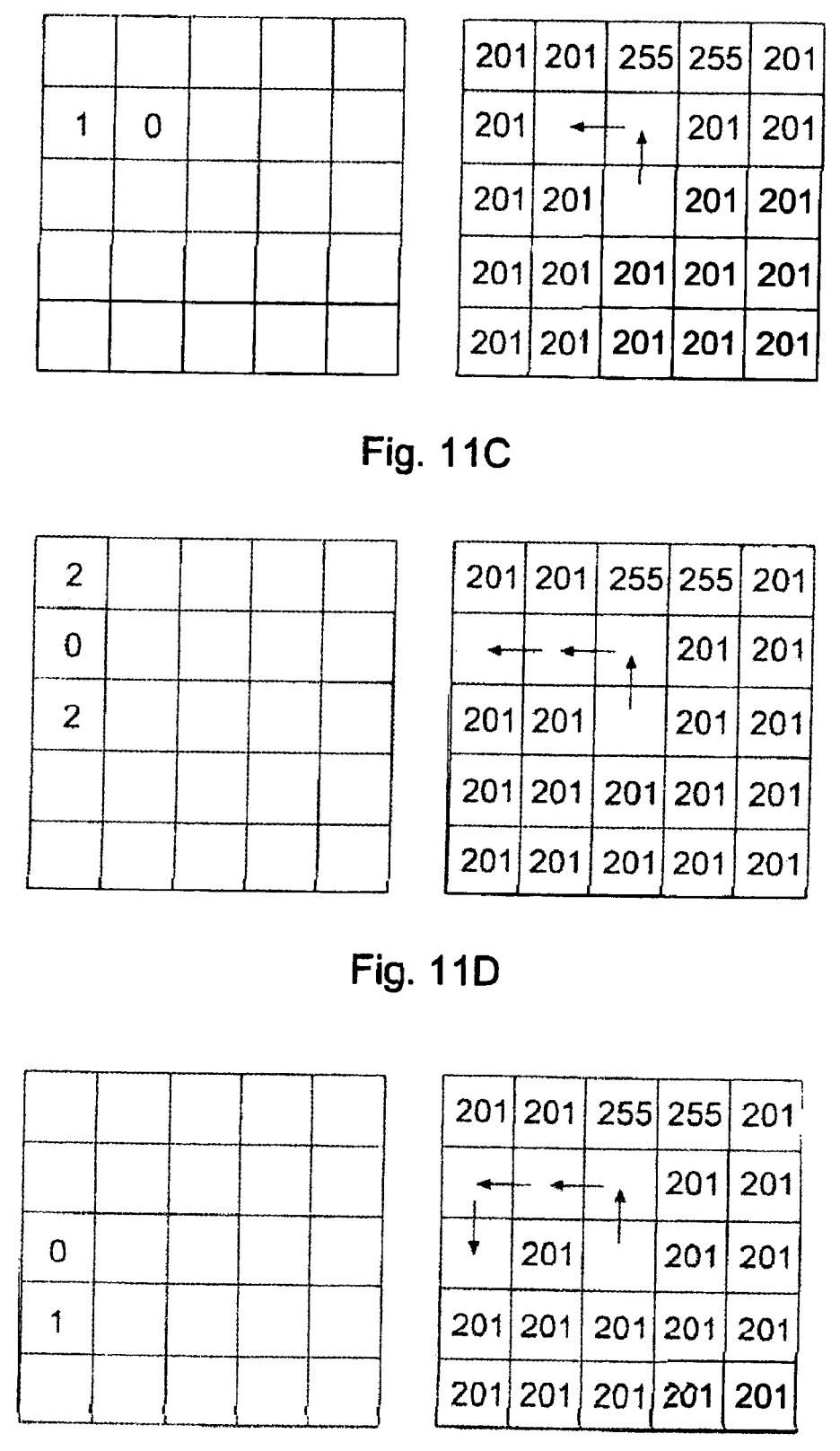
Figures 11F, 11G, 11H:
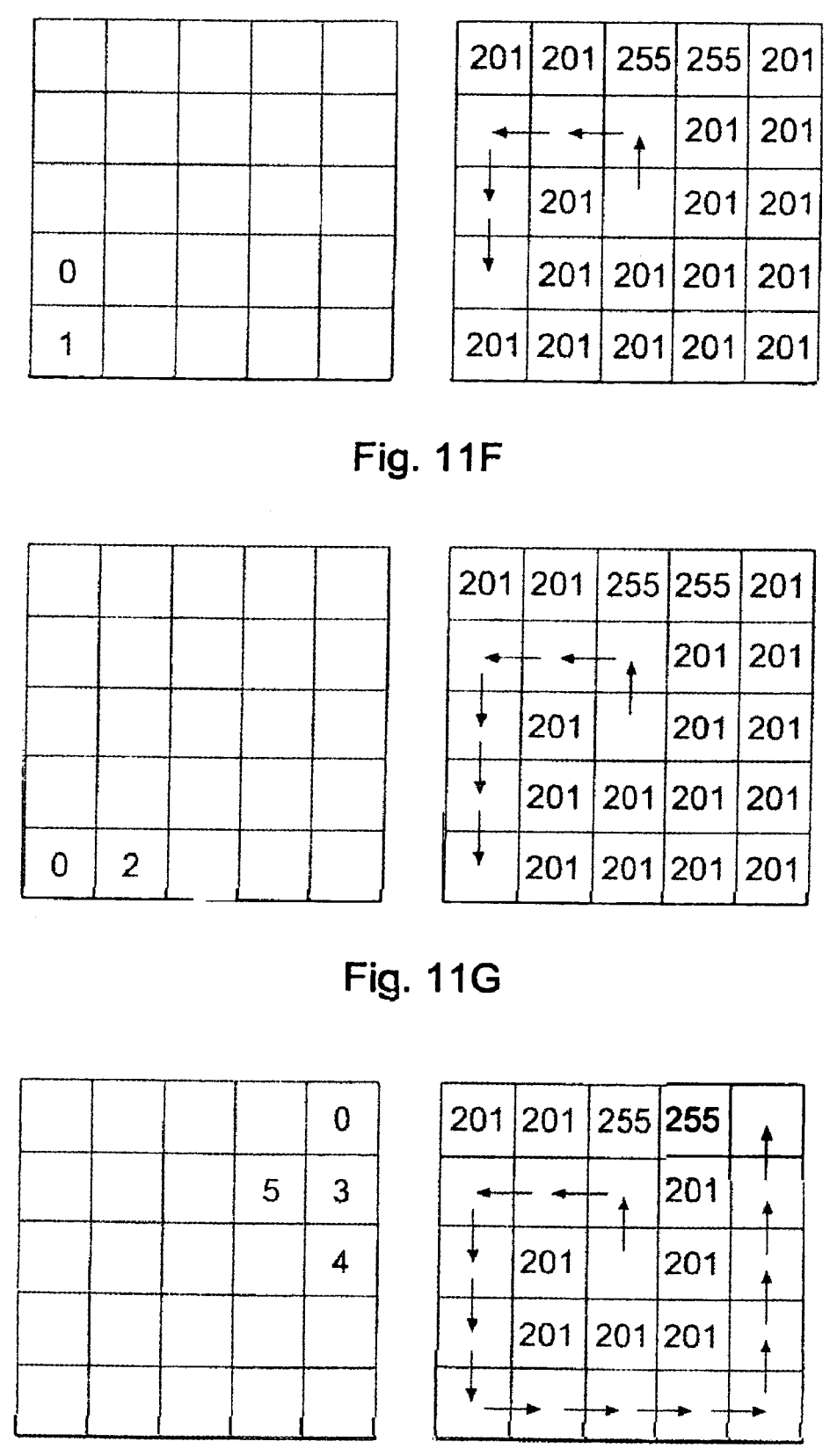
Figures 11I, 11J, 11K:
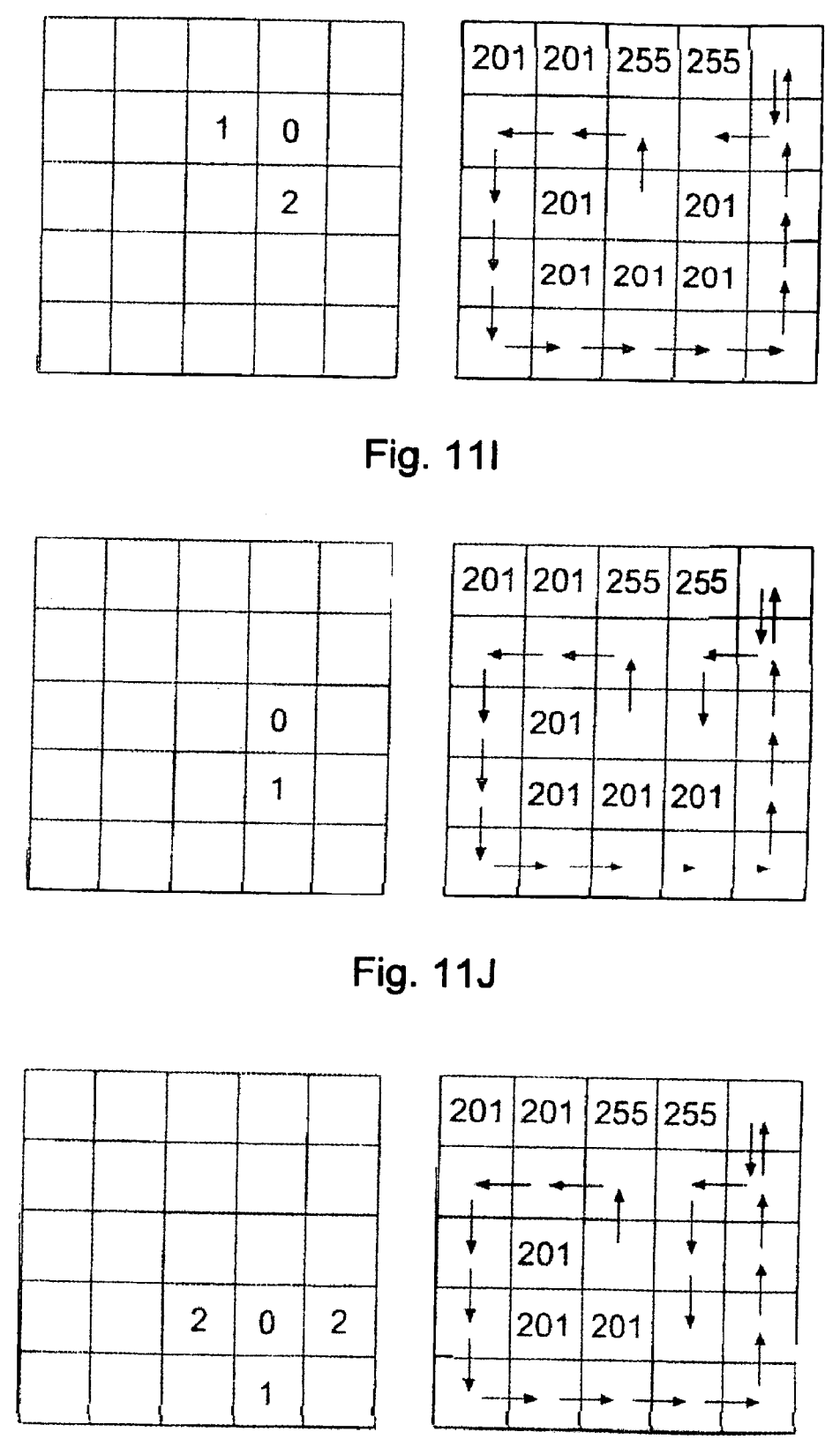
Figure 11L:
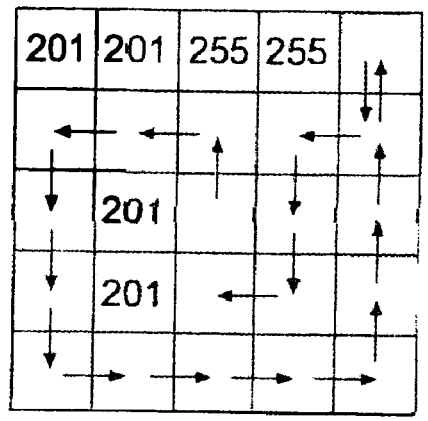
Figure 11M:
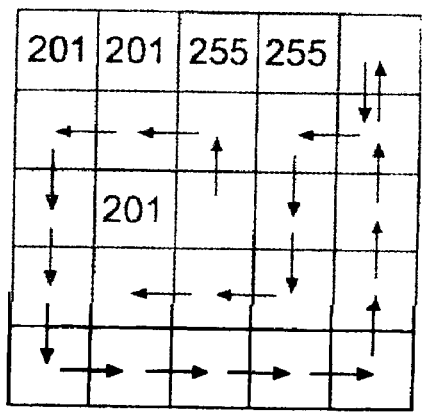
Figure 11N:
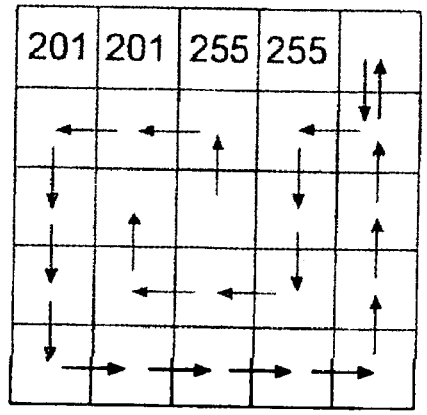
Figure 11O:
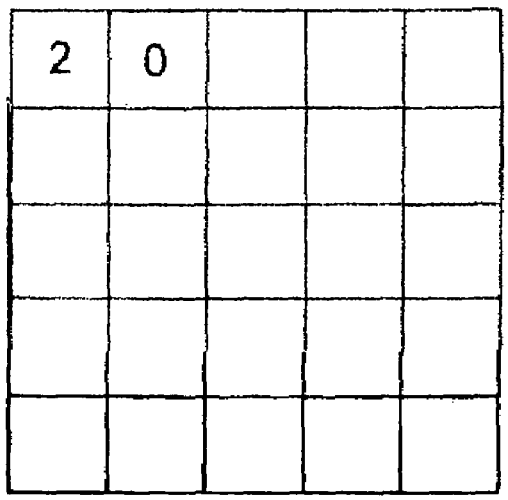
Figure 11O:
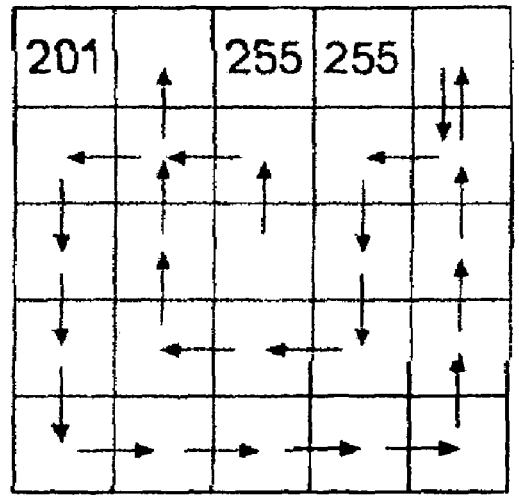
Figure 11P:
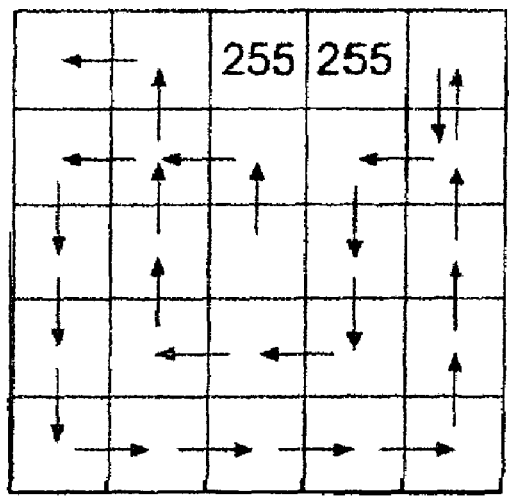

The control software produces, and continuously updates, a cell-based map of the area to be cleaned, as can be seen from the drawings at the right-hand side of each of FIGS. 11A–O and FIG. 11P. Each of the cells is identified as cleaned, uncleaned or occupied by an obstacle. Cleaned cells are usually indicated by 200, while uncleaned cells are indicated by 201 and cells occupied by obstacles of any kind are indicated by 255. In the following description, however, cleaned cells will simply be indicated by the trace of the movement of the vacuum cleaner. The control software also produces search maps, as illustrated by the drawings at the left-hand side of each of FIGS. 11A–O.

As can be seen from the cell-based map of FIG. 11A, the vacuum cleaner, initially, is located in the middle of the area to be cleaned, surrounded by uncleaned cells. It is possible to drive forward one step to find an uncleaned cell at a cost of 1 unit, and the cleaner, therefore, does so. From its new position, it is not possible for the cleaner to continue to proceed in a forward direction due to the obstacle, as can be seen in FIG. 11B. Therefore, the cleaner has to turn to the left or the right to reach the next uncleaned cell (at a cost of 2). In the embodiment being described, the default choice is predetermined to be a left turn if it is possible to turn either to the left or to the right. Therefore, the cleaner turns to the left and drives forward one cell (FIG. 11C). Similarly, if two cells can be preferentially accessed, and one cell may be accessed without any turns of the cleaner but access to the other cell requires the cleaner to turn, the default choice is predetermined to be the cell that requires no turns.

The vacuum cleaner then continues to drive forward (FIG. 11D), and turns to the left (FIG. 11E) when it reaches the left outer boundary of the predetermined cleaning area. The cleaner now continues to drive along this boundary (FIGS. 11F–G) until it reaches the lower outer boundary of the cleaning area. The vacuum cleaner then turns left and follows the lower outer boundary until it reaches the right outer boundary of the cleaning area where it once again turns left and proceeds along the right outer boundary until it reaches the upper outer boundary of the cleaning area (FIG. 11H). At this point, as will be understood, the only way for the cleaner to proceed is to turn 180 degrees. This turning operation costs 2 units. Driving forward one step after turning costs an additional 1 unit, for a total cost of 3 units. However, the cell at that location has already been cleaned, as has been the cell having a cost of 4. The cell of cost 5 is uncleaned and, therefore, the vacuum cleaner proceeds to that cell (FIG. 11I). Thereafter, the cleaner turns to the left (FIG. 11J), avoiding the obstacle to the right and the cell immediately forward of it that has already been cleaned.

From this last position, the cleaner finds an uncleaned cell in the forward direction and, consequently, drives forward one cell (FIG. 11K). Thereafter, the cleaner has to turn once again to reach a new uncleaned cell (FIG. 11L). From there, the cleaner continues in the forward direction (FIG. 11M), and then turns to the right (FIG. 11N). From this position, the cleaner searches for an uncleaned cell. It is determined that the cell of cost 1 is cleaned. The list of cells having a cost of 2 are then examined and it is determined, based on the search map, that the lowest-cost route to an uncleaned cell is for the cleaner to drive forward 2 cells (FIG. 11O). The remaining cell to be cleaned is finally reached by the cleaner turning to the left and driving forward 1 cell (FIG. 11P).

Figure 12:
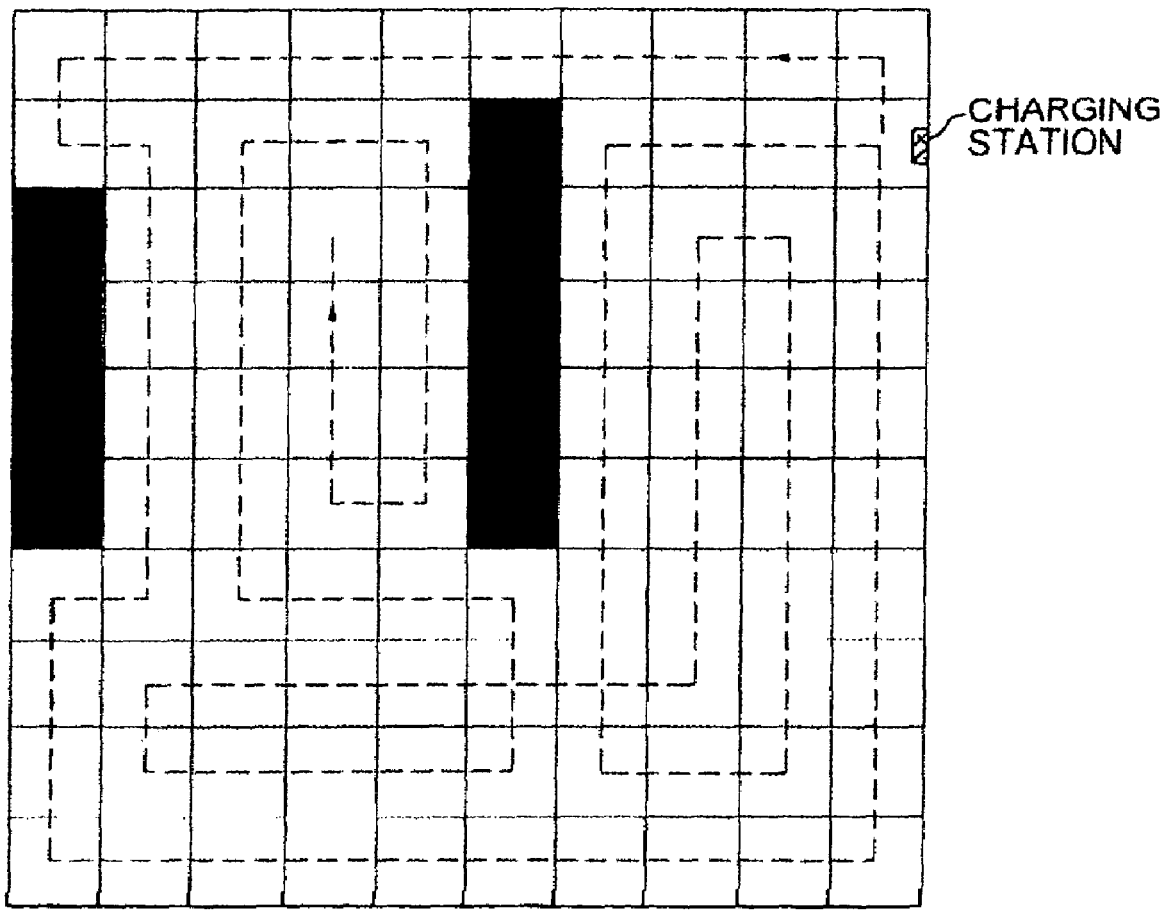
FIG. 12 is a schematic drawing of an example of how the autonomous device may navigate to perform cleaning of an entire room.

An illustrative example of how the autonomous vacuum cleaner may navigate to perform cleaning of an entire room will now be outlined with reference to FIG. 12.

In this particular example, the room has two elongated obstacles, for example, two bookshelves. It is assumed that the vacuum cleaner is initially located at the charging station, and initiates its operation by making a wall-tracking round, with (or without) the fan and brush motors operating. Once the vacuum cleaner returns to the charging station, the cleaner recognizes that the wall-tracking round has been completed. At this point, the information concerning the location of the walls and obstacles, that has been developed by the operation of the sonar system, or other sensing means, has been stored in the cleaner's control system. The vacuum cleaner then continues by using the lowest-cost navigation route available according to the invention and traverses the uncleaned areas of the room, avoiding the obstacles, as illustrated by the dash-lined tracing in FIG. 12.

The embodiments described above are merely given as examples, and it should be understood that the present invention is not limited thereto. Further modifications, changes and improvements which retain the basic underlying principles disclosed and claimed herein are within the scope and spirit of the invention.

The invention claimed is:

1. A method of navigating an autonomous carrier for the purpose of executing a selected procedure at more than one location on a field of operation, the autonomous carrier being equipped to execute that procedure, comprising the steps of providing an indication of the locations at which it is desired to execute the procedure, determining which of the locations can be preferentially accessed by the carrier from its existing position based on a defined criterion, directing the carrier from its existing position to that location, or, if more than one location can be equally preferentially accessed, to a predetermined one of those locations, executing the selected procedure at the directed location, providing an indication of the remaining locations at which the procedure is to be executed, performing the determining, directing and executing steps based on these remaining locations and the position of the carrier and, thereafter, continuing to perform, seriatim, these same steps until the selected procedure has been executed at all desired locations,
wherein the step of providing an indication of the locations at which it is desired to execute the procedure is accomplished by subdividing the field of operation into a two-dimensional grid of equal-sided cells and distinguishing those cells on the basis of cells in which the procedure is to be executed, cells in which the procedure is not to be executed, and cells which contain an obstacle, and, following the execution of the procedure in a particular cell, changing the designation of the cell to a cell in which the procedure is not to be executed, and
wherein the defined criterion comprises the determination of the least cost of energy required for the carrier to access a cell at which it is desired to execute the procedure.

2. The method of claim 1 wherein a formulation representing the defined criterion is used and cost values are assigned for each of the primary carrier functions of moving forward one cell and rotating 90 degrees.

3. The method of claim 2 wherein the carrier constitutes a vacuum cleaner and the selected procedure constitutes a vacuuming operation.

4. The method of claim 3 including the preliminary step of determining the locations of the boundaries of the field of operation and any obstacles within the boundaries of that field, and applying that information in determining which of the locations can be preferentially accessed by the carrier from its existing location.

5. The method of claim 1, wherein the defined criterion is represented by a formulation having variables which produce a numeric value for each cell which is representative of that cell's preferential accessibility to the carrier, and the steps of determining which of the cells, in which the procedure is to be executed, can be preferentially accessed is accomplished by identifying those cells having a numeric value equal to the numeric value which represents the greatest degree of preferential accessibility, evaluating whether any of the identified cells constitutes a cell in which the procedure is to be executed and specifying any such cell as the cell to which the carrier is to be directed, if no such cell is specified, incrementally adjusting the numeric value which represents the greatest degree of preferential accessibility to a new numeric value which represents an incrementally lesser degree of preferential accessibility, identifying those cells having a numeric value equal to the new numeric value, evaluating whether any of the identified cells constitutes a cell in which the procedure is to be executed and specifying any such cell as the cell to which the carrier is to be directed, and, if no such cell is specified, incrementally adjusting the new numeric value to a numeric value which represents an incrementally lesser degree of preferential accessibility and, thereafter, continuing to perform, seriatim, the foregoing steps until a cell is specified as the cell to which the carrier is to be directed.

6. The method of claim 5, wherein cost values are assigned in the formulation for each of the primary carrier functions of moving forward one cell and rotating 90 degrees.

7. The method of claim 6 wherein the carrier constitutes a vacuum cleaner and the selected procedure constitutes a vacuuming operation.

8. The method of claim 7 including the preliminary step of determining the locations of the boundaries of the field of operation and any obstacles within the boundaries of that field, and applying that information in determining which of the locations can be preferentially accessed by the carrier from its existing location.

9. The method of claim 1, wherein the defined criterion is represented by a formulation having variables which produce a numeric value for each cell representative of that cell's preferential accessibility to the carrier and the step of determining which of the cells, in which the procedure is to be executed, can be preferentially accessed is accomplished by assigning each cell in edge-to-edge contact with the cell in which the carrier is positioned to a respective list of cells having equal numeric values, performing a first evaluation of whether any of the cells in the list of cells having a numeric value representative of the greatest degree of preferential accessibility is a cell in which the procedure is to be executed and specifying any such cell as the cell to which the carrier is to be directed, if no such cell is specified, removing from further consideration the list of cells included in the first evaluation, assigning each cell in edge-to-edge contact with the cells included in the first evaluation to a respective list of cells having an equal numeric value, performing a second evaluation of whether any of the cells in the list of cells having a numeric value representative of a degree of preferential accessibility incrementally less than that of the cells in the first evaluation is a cell in which the procedure is to be executed and specifying any such cell as the cell to which the carrier is to be directed, and, if no such cell is specified, thereafter continuing to perform, seriatim, the foregoing steps until a cell is specified as the cell to which the carrier is to be directed.

10. The method of claim 9, wherein cost values are assigned in the formulation for each of the primary carrier functions of moving forward one cell and rotating 90 degrees.

11. The method of claim 10 wherein the carrier constitutes a vacuum cleaner and the selected procedure constitutes a vacuuming operation.

12. The method of claim 11 including the preliminary step of determining the locations of the boundaries of the field of operation and any obstacles within the boundaries of that field, and applying that information in determining which of the locations can be preferentially accessed by the carrier from its existing location.

13. The method of claim 12 including following the preliminary step with the step of executing the selected procedure over the bounded field of operation in accordance with a pre-programmed plan, and establishing as locations at which it is desired to execute the procedure those locations which did not undergo the selected procedure during the performance of the pre-programmed plan.

14. An autonomous carrier for navigating over a field of operation for the purpose of executing a selected procedure at more than one location on the field when a program is executed by a computer arranged to control the operation of the carrier, the autonomous carrier comprising means for identifying those locations on the field at which it is desired to execute the procedure, means for determining which of the locations can be preferentially accessed by the carrier from an existing position on the field based on a defined criterion and means for directing the carrier to the location determined to be preferentially accessible, wherein the means for identifying locations includes means for subdividing the field of operation into a two-dimensional grid of equal-sided cells and distinguishing those cells on the basis of cells in which the procedure is to be executed, cells in which the procedure is not to be executed and cells which contain an obstacle and means for changing the designation of a cell from one in which the procedure is to be executed to one in which the procedure is not to be executed following the execution of the procedure in the cell, and wherein the defined criterion comprises the determination of the least cost of energy required for the carrier to access a cell at which it is desired to execute the procedure.

15. The autonomous carrier of claim 14 wherein the defined criterion is represented by a formulation having variables which produce a numeric value for each cell which is representative of that cell's preferential accessibility to the carrier, and the means for determining locations includes means for identifying those cells having a numeric value which represents the greatest degree of preferential accessibility, means for evaluating whether any of the identified cells constitutes a cell in which the procedure is to be executed and program means for specifying any such cell as the cell to which the carrier is to be directed, or if no such cell is specified, for incrementally adjusting the numeric value which represents the greatest degree of preferential accessibility to a new numeric value which represents an incrementally lesser degree of preferential accessibility, means for identifying those cells having a numeric value equal to the new numeric value, means for evaluating whether any of the identified cells constitutes a cell in which the procedure is to be executed and means for specifying any such cell as the cell to which the carrier is to be directed, and, if no such cell is specified, for incrementally adjusting the new numeric value to a numeric value which represents an incrementally lesser degree of preferential accessibility until a cell is specified as the cell to which the carrier is to be directed.

16. The autonomous carrier of claim 15 wherein the defined criterion is represented by a formulation having variables which produce a numeric result for each cell which is representative of that cell's preferential accessibility to the carrier and the means for determining locations includes means for assigning each cell in edge-to-edge contact with the cell in which the carrier is positioned to a respective list of cells having equal numeric values, means for performing a first evaluation of whether any of the cells in the list of cells having a numeric value representative of the greatest degree of preferential accessibility is a cell in which the procedure is to be executed, means for specifying any such cell as the cell to which the carrier is to be directed, and if no such cell is specified, removing from further consideration the list of cells included in the first evaluation, means for assigning each cell in edge-to-edge contact with the cells included in the first evaluation to a respective list of cells having an equal numeric value, means for performing a second evaluation of whether any of the cells in the list of cells having a numeric value representative of a degree of preferential accessibility incrementally less than that of the cells in the first evaluation is a cell in which the procedure is to be executed, and means for specifying any such cell as the cell to which the carrier is to be directed, and, if no such cell is specified, for continuing such evaluations until a cell is specified as the cell to which the carrier is to be directed.

17. An autonomous carrier equipped with implements for executing a selected procedure on a field of operation, the carrier having a navigation system for directing the movement of the carrier, the navigation system including computing means for identifying those locations on the field at which it is desired to execute the procedure, for determining which of the locations can be preferentially accessed by the carrier from an existing position on the field based on a defined criterion and for directing the carrier to the location determined to be preferentially accessible, wherein the computing means includes means for subdividing the field of operation into a two-dimensional grid of equal-sided cells and distinguishing those cells on the basis of cells in which the procedure is to be executed, cells in which the procedure is not to be executed and cells which contain an obstacle, and means for changing the designation of a cell from one in which the procedure is to be executed to one in which the procedure is not to be executed following the execution of the procedure in the cell, and wherein the defined criterion comprises the determination of the least cost of energy required for the carrier to access a cell at which it is desired to execute the procedure.

18. The autonomous carrier of claim 17 wherein the carrier constitutes a vacuum cleaner and the selected procedure constitutes a vacuuming operation.

19. The autonomous carrier of claim 18 including sensing means for determining and recording the locations of the boundaries of the field and any obstacles thereon and wherein the computing means includes means for accounting for those boundaries and obstacles.

20. The autonomous carrier of claim 17, wherein the defined criterion is represented by a formulation having variables which produce a numeric value for each cell representative of that cell's preferential accessibility to the carrier, and the computing means includes means for identifying those cells having a numeric value which represents the greatest degree of preferential accessibility, means for evaluating whether any of the identified cells constitutes a cell in which the procedures is to be executed, means for specifying any such cell as the cell to which the carrier is to be directed, or if no such cell is specified, means for incrementally adjusting the numeric value which represents the greatest degree of preferential accessibility to a new numeric value which represents an incrementally lesser degree of preferential accessibility.

21. The autonomous carrier of claim 20, wherein the carrier constitutes a vacuum cleaner and the selected procedure constitutes a vacuuming operation.

22. The autonomous carrier of claim 21 including sensing means for determining and recording the locations of the boundaries of the field and any obstacles thereon, and wherein the computing means includes means for accounting for those boundaries and obstacles.

23. The autonomous carrier of claim 17, wherein the defined criterion is represented by a formulation having variables which produce a numeric value for each cell representative of that cell's preferential accessibility to the carrier, and the computing means includes means for assigning each cell in edge-to-edge contact with the cell in which the carrier is positioned to a respective list of cells having equal numeric values, means for performing a first evaluation of whether any of the cells in the list of cells having a numeric value representative of the greatest degree of preferential accessibility is a cell in which the procedure is to be executed, means for specifying any such cell as the cell to which the carrier is to be directed, and if no such cell is specified, means for removing from further consideration the list of cells included in the first evaluation, and means for assigning each cell in edge-to-edge contact with the cells included in the first evaluation to a respective list of cells having an equal numeric value.

24. The autonomous carrier of claim 17 wherein the carrier constitutes a vacuum cleaner and the selected procedure constitutes a vacuuming operation.

25. The autonomous carrier of claim 24 including sensing means for determining and recording the locations of the boundaries of the field and any obstacles thereon, and wherein the computing means includes means for accounting for those boundaries and obstacles.

* * * * *